US008853352B2

(12) United States Patent
Yan et al.

(10) Patent No.: US 8,853,352 B2
(45) Date of Patent: Oct. 7, 2014

(54) FUNCTIONALIZED POLYMER AND METHOD FOR MAKING

(75) Inventors: Yuan-Yong Yan, Copley, OH (US); Steven Luo, Copley, OH (US)

(73) Assignee: Bridgestone Corporation, Tokyo (JP)

( * ) Notice: Subject to any disclaimer, the term of this patent is extended or adjusted under 35 U.S.C. 154(b) by 1465 days.

(21) Appl. No.: 11/961,189

(22) Filed: Dec. 20, 2007

(65) Prior Publication Data

US 2008/0154020 A1 Jun. 26, 2008

Related U.S. Application Data

(60) Provisional application No. 60/870,932, filed on Dec. 20, 2006.

(51) Int. Cl.
*C08G 73/00* (2006.01)
*C08C 19/44* (2006.01)
*C08L 15/00* (2006.01)

(52) U.S. Cl.
CPC .............. *C08G 73/00* (2013.01); *C08C 19/44* (2013.01); *C08L 15/00* (2013.01)
USPC ........... 528/492; 526/335; 525/374; 525/375; 525/377; 525/381; 525/382

(58) Field of Classification Search
USPC .................... 526/340; 528/229, 422; 525/374
See application file for complete search history.

(56) References Cited

U.S. PATENT DOCUMENTS

| | | | |
|---|---|---|---|
| 3,194,797 A | | 7/1965 | Caldwell et al. |
| 3,598,884 A | * | 8/1971 | Wei ................................. 525/89 |
| 4,171,413 A | | 10/1979 | Hartman et al. |
| 4,564,659 A | | 1/1986 | Kataoka et al. |
| 4,734,461 A | * | 3/1988 | Roggero et al. .............. 525/293 |
| 4,735,994 A | * | 4/1988 | Roggero et al. .............. 525/279 |
| 4,754,005 A | * | 6/1988 | Roggero et al. ................ 526/83 |
| 4,791,174 A | * | 12/1988 | Bronstert et al. ............. 525/274 |
| 5,700,887 A | * | 12/1997 | Hahnfeld et al. ............. 526/182 |
| 2006/0052260 A1 | | 3/2006 | Duyck et al. |
| 2007/0037956 A1 | | 2/2007 | Hogan et al. |
| 2007/0293622 A1 | | 12/2007 | Yan |
| 2008/0027171 A1 | | 1/2008 | Yan et al. |
| 2008/0103252 A1 | | 5/2008 | Brumbaugh et al. |

OTHER PUBLICATIONS

D. Enders et al., "Enantioselective Synthesis of α-Substituted Primary Amines by Nucleophilic Addition to Aldehyde-SAMP Hydrazones," *Angew. Chem. Int. Ed. Engl.*, 1986, vol. 25, No. 12, pp. 1109-1110 (VCH Verlagsgesellschaft mbH; Wernheim, Germany).
A. Harada et al., "Polymerization of Azabutadiene (Azine) Derivatives. Preparation of a Stereoregular Polymer from Prionaldehyde Azine," *Macromolecules*, 1991, vol. 24, pp. 5504-5507 (American Chemical Society; Washington, DC).
D. Enders et al., "Asymmetric synthesis of amines by nucleophilic 1,2-addition of organometallic reagents to the CN-double bond," *Tetrahedron: Asymmetry*, 1997, vol. 9, No. 12, pp. 1895-1946 (Elsevier Science Ltd.; Great Britain).

A. Hashidzume et al., "Preparation and Polymerization of Benzaldehyde Formaldehyde Azine (1-Phenyl-2,3-diaza-1,2-butadiene)," *Macromolecules*, 2000, vol. 33, pp. 2397-2402 (American Chemical Society; Washington, DC).
G.K. Friestad, "Chiral N-Acylhydrazones: Versatile Imino Acceptors for Axymmetric Amine Synthesis," *Eur. J. Org. Chem.*, 2005, pp. 3157-3172 (Wiley-VCH Verlag GmbH & Co. KGaA; Wernheim, Germany).
S. Rádl, "Crisscross Cycloaddition Reactions," *Aldrichimica Acta*, 1997, vol. 30(3), pp. 97-100 (Sigma-Aldrich Co.; St.. Louis, Missouri, USA).
R. Cohen et al., "Novel Azine Reactivity: Facile N-N Bond Cleavage, C-H Activation, and N-N Coupling Mediated by $Rh^1$," *Angew Chem. Int. Ed.*, 2003, vol. 42, pp. 1949-1952 (Wiley-VCH Verlag GmbH & Co. KGaA; Weinheim, Germany).
D.D. Choytun et al., "Azines possessing strong push-pull donors/acceptors," *Chem. Commun.*, 2004, pp. 1842-1843 (The Royal Society of Chemistry; Great Britain).
M.Y. Khuhawar et al., "Syntheses and Thermoanalytical Studies of Some Schiff Base Polymers Derived from 5,5'-methylene Bis(2-Hydroxyacetophenone)," *Eur. Polym. J.*, 1998, vol. 34, No. 1, pp. 133-135 (Elsevier Science Ltd.; Great Britain).
J. Čermák et al., "Diphosphinoazines (Z,Z)-$R_2PCH_2C(Bu^1)=NN=C(Bu1)CH_2PR_2$ with R groups of various sizes and complexes $\{[(Z,Z)-R_2PCH_2C(Bu^1)=NN=C(Bu^1)CH_2PR_2][\eta^3-CH_2C(CH_3)=CH_2PdCl]_2\}$," *Inorganica Chemica Acta*, 2001, vol. 313, pp. 77-86 (Elsevier Science B.V., Netherlands).
M.F.N.N. Carvalho et al., "Activation of a coordinated alkyne by electron transfer: . . . ," *Journal of Organometallic Chemistry*, 2000, vol. 598, pp. 318-328 (Elsevier Science S.A.; Netherlands).
A. Singh et al., "Arene ruthenium complexes incorporating immine/azine hybrid-chelating N-N' donor ligands: synthetic, spectral, structural aspects and DFT studies," *Journal of Organometallic Chemistry*, 2004, vol. 689, pp. 1821-1834 (Elsevier B.V.; Netherlands).
M. Chandra et al., "Potential inhibitors of DNA topoisomerase II: ruthenium(II) poly-pyridyl and pyridyl-azine complexes," *Journal of Organometallic Chemistry*, 2004, vol. 689, pp. 2256-2267 (Elsevier B.V.; Netherlands).
S.K. Singh et al., "Helices of ruthenium complexes involving pryidyl-azine ligands: synthesis, spectral, and structural aspects," *Journal of Organometallic Chemistry*, 2004, vol. 689, pp. 3612-3620 (Elsevier B.V.; Netherlands).

*Primary Examiner* — Randy Gulakowski
*Assistant Examiner* — Rachel Kahn
(74) *Attorney, Agent, or Firm* — Meredith E. Hooker; David G. Burleson

(57) ABSTRACT

A functionalized polymer includes a directly bonded moiety, which can be located at a terminus of the polymer, defined by the formula —$CR^1R^2NH$-Q-M where M is ($N=CR^1R^2$) or N-($QN=CR^1R^2$)$_2$ each Q independently is a substituted or unsubstituted, cyclic or acyclic $C_1$-$C_{40}$ alkyl, aryl, or alkaryl radical, and each $R^1$ and $R^2$ independently is a hydrogen atom or a substituted or unsubstituted alkyl, alkenyl, cycloalkyl, cycloalkenyl, aryl, allyl, aralkyl, alkaryl, or alkynyl group. The polymer can be provided by introducing a polyimine compound into a system that includes carbanionic (living) polymer. Such polymers can be used in the production of compositions that include particulate fillers.

5 Claims, No Drawings

(56) References Cited

OTHER PUBLICATIONS

D.A. Edwards et al., "Some aspects of the coordination chemistry of 2-pyridinecarbaldehyde azine, (2-paa) . . . ," *Polyhedron*, 1998, vol. 17, Nos. 13-14, pp. 2321-2326 (Elsevier Science Ltd.; Great Britain).

J. Granifo et al., "Synthesis and characterization of polynuclear complexes of molybdenum carbonyl derivatives with pyridine-2-carbaldehyde azine (pa) and ferrocenylphosphines . . . ," *Polyhedron*, 1998, vol. 17, No. 10, pp. 1729-1733 (Elsevier Science Ltd.; Great Britain).

H-Y Noh et al., "Addition reactions to chiral aziridine-2-carboxaldimine toward various enantiopure nitrogen-containing heterocycles," *Tetrahedron*, 2005, vol. 61, pp. 9281-9290 (Elsevier Ltd.; Great Britain).

Y-G Lim et al., "Rhodium-catalyzed alkylation of aromatic azines with alkenes via C-H bond activation," *Tetrahedron Letters*, 2005, vol. 46, pp. 385-388 (Elsevier Ltd.; Great Britain).

E.M. McGarrigle et al., "Chromium- and Manganese-Salen Promoted Epoxidation of Alkenes," *Chem. Rev.*, 2005, vol. 105, No. 5, pp. 1563-1602 (American Chem. Soc.; Washington, D.C.).

M. Holbach et al., "A Practical One-Pot Synthesis of Enantiopure Unsymmetrical Salen Ligands," *J. Org. Chem.*, 2006, vol. 71, pp. 2903-2906 (American Chem. Soc.; Washington, D.C.).

\* cited by examiner

FUNCTIONALIZED POLYMER AND METHOD FOR MAKING

This application claims the benefit of provisional patent application No. 60/870,932 filed 20 Dec. 2006, the entirety of which is incorporated herein by reference.

BACKGROUND INFORMATION

Rubber goods such as tire treads often are made from elastomeric compositions that contain one or more reinforcing materials such as, for example, particulate carbon black and silica; see, e.g., *The Vanderbilt Rubber Handbook*, 13th ed. (1990), pp. 603-04.

Good traction and resistance to abrasion are primary considerations for tire treads; however, motor vehicle fuel efficiency concerns argue for a minimization in their rolling resistance, which correlates with a reduction in hysteresis and heat build-up during operation of the tire. These considerations are, to a great extent, competing and somewhat contradictory: treads made from compositions designed to provide good road traction usually exhibit increased rolling resistance and vice versa.

Filler(s), polymer(s), and additives typically are chosen so as to provide an acceptable compromise or balance of these properties. Ensuring that reinforcing filler(s) are well dispersed throughout the elastomeric material(s) both enhances processability and acts to improve physical properties. Dispersion of fillers can be improved by increasing their interaction with the elastomer(s). Examples of efforts of this type include high temperature mixing in the presence of selectively reactive promoters, surface oxidation of compounding materials, surface grafting, and chemically modifying the polymer, typically at a terminus thereof.

Many types of elastomeric materials are used in the manufacture of vulcanizates such as, e.g., tire components. In addition to natural rubber, some of the most commonly employed include high-cis polybutadiene, often made by catalyzed processes, and substantially random styrene/butadiene interpolymers, often made by processes employing anionic initiators. Functionalities that can be incorporated into high-cis polybutadiene often cannot be incorporated into anionically initiated styrene/butadiene interpolymers and vice versa.

SUMMARY

In one aspect is provided a polymer that includes a terminal moiety defined by one of the following formulas

—CR¹R₂NH-Q-N=CR¹R₂ (I) and

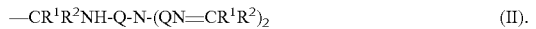
—CR¹R²NH-Q-N-(QN=CR¹R²)₂ (II).

In formulas (I) and (II), each Q independently is a substituted or unsubstituted, cyclic or acyclic $C_1$-$C_{40}$ hydrocarbylene group (e.g., alkylene, arylene, etc.), and each R¹ and R² independently is a hydrogen atom or a substituted or unsubstituted alkyl, alkenyl, cycloalkyl, cycloalkenyl, aryl, allyl, aralkyl, alkaryl, or alkynyl group.

In another aspect is provided a functionalized polymer that includes the reaction product of a carbanionic polymer chain and a polyimine compound; the method involved in this reaction also is provided. In certain embodiments, the polyimine compound can have a structure defined by either of the following formulas

Q-(N=CR¹R²)₂ (III) and

N—[Q-(N=CR¹R²)]₃ (IV)

where Q, R¹ and R² are defined as above.

In yet another aspect is provided a macromolecule that includes the reaction product of two carbanionic polymer chains and a polyimine compound; the method involved in this reaction also is provided. In certain embodiments, the polyimine compound can be defined by one of formulas (III) or (IV).

In a still further aspect is provided a macromolecule that includes the reaction product of three carbanionic polymer chains and a polyimine compound; the method involved in this reaction also is provided. In certain embodiments, the polyimine compound can be defined by formula (IV).

In yet still further aspects are provided macromolecules defined by one of the following formulas

[{p}CR¹R²NH]₂-Q (V),

[{p}-CR¹R²NH-Q]₂-N-(QN=CR¹R²) (VI), and

[{p}-CR¹R²NH-Q]₃-N (VII)

where each {p} represents a polymer chain and Q, R¹ and R² are defined as above.

In another aspect is provided a polymer with terminal functionality that includes at least four nitrogen atoms. The nitrogen atoms are positioned such that each is separated from the next closest N by no more than three intermediate atoms and, in certain embodiments, by no more than two intermediate atoms.

Regardless of how characterized, the polymer can interact with particulate filler such as, e.g., carbon black and silica. Compositions, including vulcanizates, that include particulate fillers and such polymers also are provided, as are methods of providing and using such compositions.

In any or each of these aspects, the polymer can include directly bonded aromatic pendent groups, can be substantially linear, and/or can include unsaturation within and/or pendent from the polymer chain. This unsaturation can result from incorporation of polyene mer units and preferably is substantially random along the polymer chain.

Other aspects of the invention will be apparent to the ordinarily skilled artisan from the description of illustrative embodiments that follows.

To assist in understanding the following description of various embodiments, certain definitions are provided immediately below. These are intended to apply throughout unless the surrounding text explicitly indicates a contrary intention:

"polymer" means the polymerization product of one or more monomers and is inclusive of homo-, co-, ter-, tetra-polymers, etc.;

"macromolecule" means a chemical that includes within its structure two or more polymeric chains;

"mer" or "mer unit" means that portion of a polymer derived from a single reactant molecule (e.g., ethylene mer has the general formula —$CH_2CH_2$—);

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetrapolymers, and the like;

"carbanionic" and "living" are used interchangeably;

"polyimine compound" means a compound that includes two or more >C=N— groups, with the N atoms of adjacent imine functionalities being connected through a linking group;

"substituted" means one containing a heteroatom or functionality (e.g., hydrocarbyl group) that does not interfere with the intended purpose of the group in question;

"directly bonded" means covalently attached with no intervening or interposed atoms or groups;

"polyene" means a molecule with at least two double bonds located in the longest portion or chain thereof, and specifically is inclusive of dienes, trienes, and the like;

"radical" means that portion of a molecule which remains after reacting with another molecule, regardless of whether any atoms are gained or lost as a result of the reaction;

"terminus" means an end of a polymeric chain; and

"terminal moiety" means a group or functionality located at a terminus.

Throughout this document, all values given in the form of percentages are weight percentages unless the surrounding text explicitly indicates a contrary intention.

DESCRIPTION OF ILLUSTRATIVE EMBODIMENTS

As apparent from the foregoing Summary, the functionalized macromolecular materials (i.e., polymers and macromolecules) can be described in a variety of ways and can be provided by introducing a polyimine compound into a system that includes carbanionic (living) polymer, advantageously one that includes pendent aromatic groups and unsaturation within or pendent from the polymer chain. The molar ratio of polyimine compound(s) to polymer chains can be adjusted so as to control the number of chains attached to a polyimine radical.

The polymer can be elastomeric and can include mer units that include unsaturation such as those derived from polyenes, particularly dienes and trienes (e.g., myrcene). Illustrative polyenes include $C_4$-$C_{12}$ dienes, particularly conjugated dienes such as, but not limited to, 1,3-butadiene, isoprene, 1,3-pentadiene, 2,3-dimethyl-1,3-butadiene, and 1,3-hexadiene.

Directly bonded pendent aromatic groups can be provided through incorporation of mer units derived from vinyl aromatics, particularly the $C_8$-$C_{20}$ vinyl aromatics such as, e.g., styrene, α-methyl styrene, p-methyl styrene, the vinyl toluenes, and the vinyl naphthalenes. When used in conjunction with one or more polyenes, mer units with pendent aromaticity can constitute from about 1 to about 50%, from about 10 to about 45%, or from about 20 to about 35%, of the polymer chain. The microstructure of such interpolymers can be random, which means that the mer units derived from each type of constituent monomer generally do not form blocks and, instead, are incorporated in a non-repeating, essentially simultaneous manner. Random microstructure can provide particular benefit in some end use applications such as, e.g., rubber compositions used in the manufacture of tire treads.

Exemplary elastomers include interpolymers of one or more polyenes and styrene such as, e.g., poly(styrene-co-butadiene), also known as SBR.

Polyenes can incorporate into polymeric chains in more than one way. Especially for rubber compositions intended for tire tread applications, controlling this manner of polyene incorporation can be desirable. A polymer chain with an overall 1,2-microstructure, given as a numerical percentage based on total polyene content, of from about 10 to about 80%, optionally from about 25 to 65%, can be desirable for certain end use applications. Substantially linear polymers are those that have an overall 1,2-microstructure of no more than about 50%, preferably no more than about 45%, more preferably no more than about 40%, even more preferably no more than about 35%, and most preferably no more than about 30%, based on total polyene content.

The number average molecular weight ($M_n$) of the polymer typically is such that a quenched sample exhibits a gum Mooney viscosity ($ML_4/100°$ C.) of from ~2 to ~150, more commonly from ~2.5 to ~125, even more commonly from ~5 to ~100, and most commonly from ~10 to ~75.

These types of polymers can be made by any of a variety of polymerization techniques. Solution polymerization generally affords a higher degree of control with respect to such properties as randomness, microstructure, etc., although other techniques, e.g., emulsion polymerization, also can be utilized. Solution polymerizations have been performed since about the mid-20th century, so the general aspects thereof are known to the ordinarily skilled artisan; nevertheless, certain aspects are provided here for convenience of reference.

Solution polymerizations typically involve an initiator as opposed to, e.g., a catalyst. Exemplary initiators include organolithium compounds, particularly alkyllithium compounds. Examples of organolithium initiators include N-lithio-hexamethyleneimine; n-butyllithium; tributyltin lithium; dialkylaminolithium compounds such as dimethylaminolithium, diethylaminolithium, dipropylaminolithium, dibutylaminolithium and the like; dialkylaminoalkyllithium compounds such as diethylaminopropyllithium; and those trialkylstanyl lithium compounds involving $C_1$-$C_{12}$, preferably $C_1$-$C_4$, alkyl groups.

Multifunctional initiators, i.e., initiators capable of forming polymers with more than one living end, also can be used. Examples of multifunctional initiators include, but are not limited to, 1,4-dilithiobutane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, and 4,4'-dilithiobiphenyl.

In addition to organolithium initiators, so-called functionalized initiators which become incorporated into the polymer chain, thus providing a functional group at the initiated end of the chain, also can be used. Examples of such materials include lithiated aryl thioacetals (see, e.g., U.S. Pat. Publ. No. 2006/0030657, the disclosure of which is incorporated herein by reference) and the reaction products of organolithium compounds and, for example, N-containing organic compounds such as substituted aldimines, ketimines, secondary amines, etc., optionally pre-reacted with a compound such as diisopropenyl benzene (see, e.g., U.S. Pat. Nos. 5,153,159 and 5,567,815).

Useful anionic polymerization solvents include various $C_5$-$C_{12}$ cyclic and acyclic alkanes as well as their alkylated derivatives, certain liquid aromatic compounds, and mixtures thereof, the ordinarily skilled artisan is aware of other useful solvent options and combinations.

In solution polymerizations, both randomization and vinyl content (i.e., 1,2-microstructure) can be increased by including a coordinator, usually a polar compound, in the polymerization ingredients. Up to 90 or more equivalents of coordinator can be used per equivalent of initiator, with the amount depending on, e.g., the amount of vinyl content desired, the level of non-polyene monomer employed, the reaction temperature, and nature of the specific coordinator employed. Compounds useful as coordinators include organic compounds that include a heteroatom having a non-bonded pair of electrons (e.g., O or N). Examples include dialkyl ethers of mono- and oligo-alkylene glycols; crown ethers; tertiary amines such as tetramethylethylene diamine; THF; THF oligomers; linear and cyclic oligomeric oxolanyl alkanes (see, e.g., U.S. Pat. No. 4,429,091) such as 2,2-bis(2'-tetrahydrofuryl)propane, di-piperidyl ethane, hexamethylphosphoramide, N,N'-dimethylpiperazine, diazabicyclooctane, diethyl ether, tributylamine, and the like.

Although the ordinarily skilled artisan understands the conditions typically employed in solution polymerization, a representative description is provided for the convenience of the reader. The following is based on a batch process, although extending this description to, e.g., semi-batch or continuous processes is within the capability of the ordinarily skilled artisan.

Solution polymerizations typically begin by charging a blend of monomer(s) and solvent to a suitable reaction vessel, followed by addition of a coordinator (if used) and initiator, which often are added as part of a solution or blend; alternatively, monomer(s) and coordinator can be added to the initiator. The procedure typically is carried out under anhydrous, anaerobic conditions due primarily to the moisture and air sensitivity of most initiators and living polymers made therewith. The reactants can be heated up to about 150° C. and agitated. After a desired degree of conversion has been reached, the heat source (if used) can be removed and, if the reaction vessel is to be reserved solely for polymerizations, the reaction mixture is removed to a post-polymerization vessel for functionalization and/or quenching. At this point, the reaction mixture commonly is referred to as a "polymer cement" because of its relatively high concentration of polymer.

At this point can be provided to the polymer a moiety defined by one of formulas (I) and (II) above or, as described in more detail below, a macromolecule as defined by one of formulas (V), (VI), and (VII). A convenient manner of providing such a moiety is by reacting a carbanionic polymer, optionally in polymer cement form, with one or more polyimine compounds. Exemplary polyimines are defined by formulas (III) and (IV) above.

In these formulas, each Q independently can be a substituted or unsubstituted, cyclic or acyclic $C_1$-$C_{40}$ alkyl, aryl, or alkaryl radical; in certain embodiments, Q can take the form of an unsubstituted $C_2$-$C_6$, particularly $C_2$-$C_3$, alkyl group or a $C_5$-$C_6$ cycloalkyl group. Additionally, each $R^1$ and $R^2$ independently can be H or a substituted or unsubstituted alkyl, alkenyl, cycloalkyl, cycloalkenyl, aryl, allyl, aralkyl, alkaryl, or alkynyl group; non-limiting examples include arylene groups such as benzylidene; substituted arylene groups such as pyridylmethylidene, nitrobenzylidene, dimethylaminobenzylidene, and the like; cycloalkylene groups such as cyclohexylmethylidene, cyclopentylmethylidene, and the like; and substituted cycloalkylene groups such as tetrahydrofurylmethylidene. In certain embodiments, at least two of the $R^1$ groups can be aryl groups and/or substituted aryl groups with at least one heteroatom, particularly a nitrogen atom, in or pendent from the aromatic ring of the aryl group.

Specific examples of potentially useful polyimine compounds include, but are not limited to, bis-imine compounds such as N,N'-bis(2-benzylidene)ethylenediamine, N,N'-bis(2-pyridylmethylidene)ethylenediamine, N,N'-bis(3-pyridylmethylidene)ethylenediamine, N,N'-bis(4-pyridylmethylidene)ethylenediamine, N,N'-bis(2-thienylmethylidene)ethylenediamine, N,N'-bis(3-thienylmethylidene)ethylenediamine, N,N'-bis(2-tetrahydrofurylmethylidene)ethylenediamine, N,N'-bis(3-tetrahydrofurylmethylidene)ethylenediamine, N,N'-bis(4-dimethylaminobenzylidene)ethylenediamine, N,N'-bis(4-diethylaminobenzylidene)ethylenediamine, N,N'-bis(4-dibutylaminobenzylidene)ethylenediamine, N,N'-bis(2-nitrobenzylidene)ethylenediamine, N,N'-bis(3-nitrobenzylidene)ethylenediamine, N,N'-bis(4-nitrobenzylidene)ethylenediamine, N,N'-bis(2-methoxybenzylidene)ethylenediamine, N,N'-bis(3-methoxybenzylidene)ethylenediamine, N,N'-bis(4-methoxybenzylidene)ethylenediamine, N,N'-bis(4-methoxybenzylidene)ethylenediamine, N,N'-bis(cyclohexylmethylidene)ethylenediamine, bis(cyclopentylmethylidene)ethylenediamine, N,N'-bis(2-benzylidene)-1,2-cyclohexanediamine, N,N'-bis(2-pyridylmethylidene)-1,2-cyclohexanediamine, N,N'-bis(3-pyridylmethylidene)-1,2-cyclohexanediamine, N,N'-bis(4-pyridylmethylidene)-1,2-cyclohexanediamine, N,N'-bis(2-thienylmethylidene)-1,2-cyclohexanediamine, N,N'-bis(3-thienylmethylidene)-1,2-cyclohexanediamine, N,N'-bis(2-tetrahydrofurylmethylidene)-1,2-cyclohexanediamine, N,N'-bis(3-tetrahydrofurylmethylidene)-1,2-cyclohexanediamine, N,N'-bis(4-dimethylaminobenzylidene)-1,2-cyclohexanediamine, N,N'-bis(4-diethylaminobenzylidene)-1,2-cyclohexanediamine, N,N'-bis(4-dibutylaminobenzylidene)-1,2-cyclohexanediamine, N,N'-bis(2-nitrobenzylidene)-1,2-cyclohexanediamine, N,N'-bis(3-nitrobenzylidene)-1,2-cyclohexanediamine, N,N'-bis(4-nitrobenzylidene)-1,2-cyclohexanediamine, N,N'-bis(2-methoxybenzylidene)-1,2-cyclohexanediamine, N,N'-bis(3-methoxybenzylidene)-1,2-cyclohexanediamine, N,N'-bis(4-methoxybenzylidene)-1,2-cyclohexanediamine, bis(cyclohexylmethylidene)-1,2-cyclohexanediamine, bis(cyclopentylmethylidene)-1,2-cyclohexanediamine, as well as tris-imine compounds such as tris-[(benzylideneamino)ethyl]amine, tris[[(2-methoxybenzyl)amino]ethyl]amine, tris[[(2-pyridylmethylidene)amino]ethyl]amine, tris[[(3-pyridylmethylidene)amino]ethyl]amine, and tris[[(4-pyridylmethylidene)amino]ethyl]amine.

Depending on the ratio of polymer chains (i.e., initiator equivalents) to polyimine compound(s) as well as the type of polyimine compound(s) utilized, the result can be one or more functional polymers that include moieties defined by formulas (I) and/or (II) and/or one or more macromolecules defined by general formulas (V), (VI), and (VII).

Regardless of the particular structure of the polymer or macromolecule, it can include at least one functional group that includes at least four nitrogen atoms positioned such that no more than three, and sometimes no more than two, intermediate atoms separate each N atom from its closest neighboring N atom (In counting intermediate atoms, only those atoms that are directly bonded to a nitrogen atom and/or each other are counted. For example, where two N atoms are separated from each other by two methylene groups, with each N atom being directly bonded only to the C atom of one of the methylene groups, the N atoms are separated only by the two intermediate C atoms, and the four H atoms bonded to the two C atoms are not counted in determining the number of atoms intermediate the two N atoms.)

In the bis-imine compound represented in formula (III), where both $R^1$ groups are phenyl groups, the functional group defined by the radical of that bis-imine compound has a structure similar to that of a chiral salen ligand. Represented below are Jacobsen's salen ligand (formula (VIII), with $Bu^t$ representing a t-butyl group), four bis-imine compounds having structures similar thereto (formulas (IX)-(XII)); two bis-imine compounds having structures which involve three cyclic groups (formulas (XIII) and (XIV)), the latter of which employs an alternative arrangement of four nitrogen atoms; and two tris-imine compounds having fairly analogous structures (formulas (XV) and (XVI)):

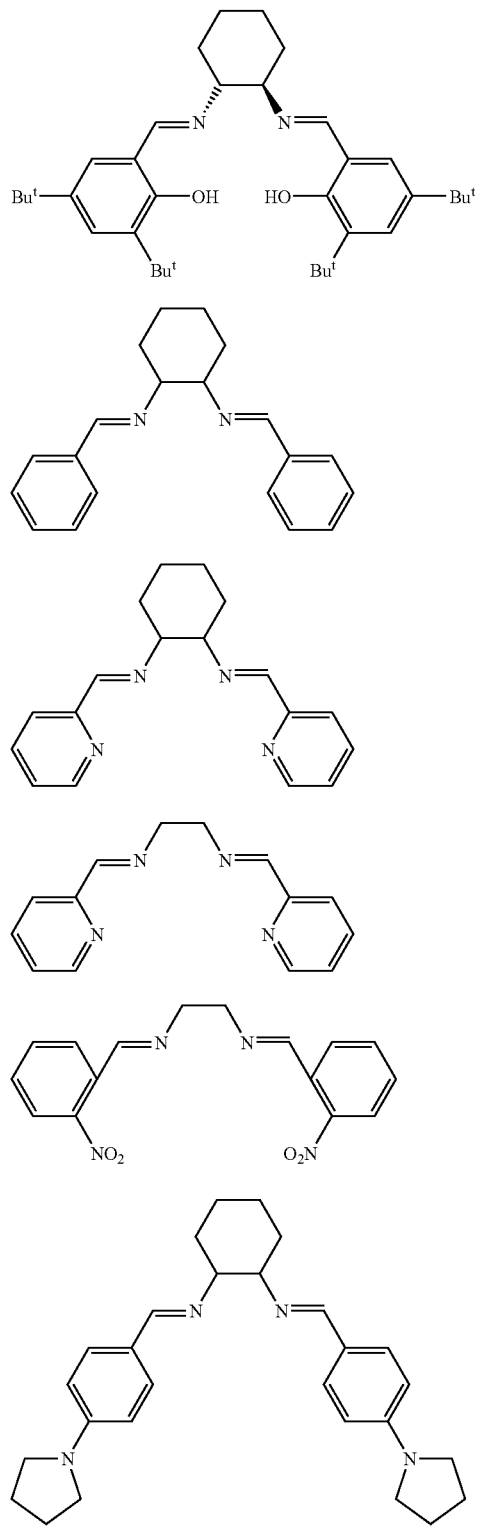

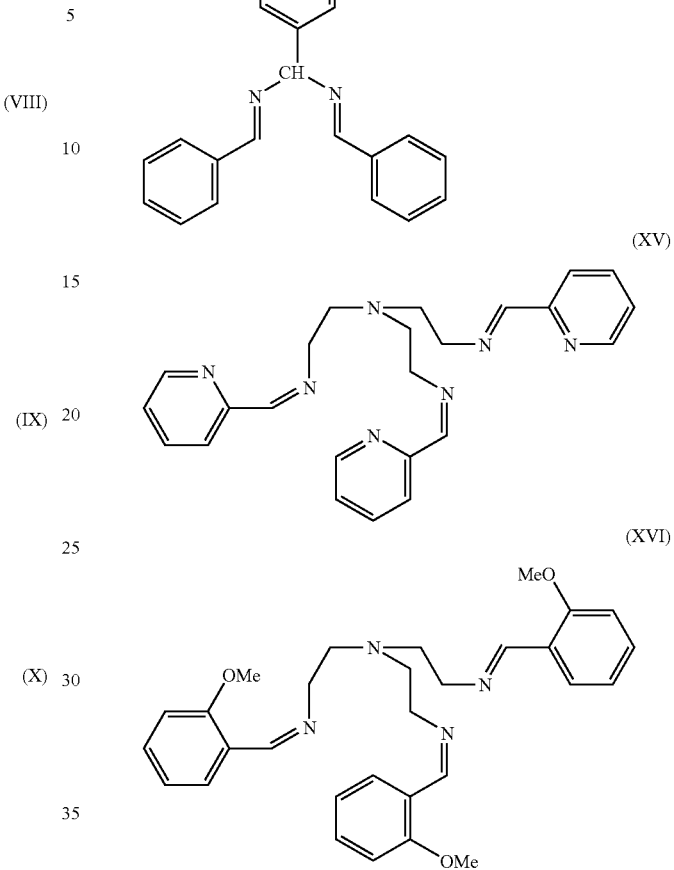

(with Me representing a methyl group).

Where the phenyl groups happen to be substituted, particularly with heteroatoms, and most particularly with N atoms, positioned such that the ring N atoms are separated by no more than two or three intermediate atoms from the N atoms which had constituted parts of the imine functionalities (such as, e.g., those imines defined by formulas (X) to (XII) above), the resulting functionality can provide a high density of heteroatoms in an arrangement resembling an arc or semicircle. While not wishing to be bound by theory, the opening of the "arc" might be of a size of that permits particulate filler particles or portions thereof to act similarly to certain metal atoms in organometallic complexes.

A moiety such as that defined in formula (I) or (II) can be provided by functionalizing a polymer prior to quenching, advantageously when it is in the aforementioned polymer cement state. One method of effecting this functionalization involves introducing to the polymer cement one or more polyimine compounds (such as, e.g., those defined by formulas (III) and (IV)) and allowing such compound(s) to react at the living terminus of the polymer; the carbon atom of one of the imine groups is believed to add to the carbanionic polymer chain. Where the equivalents of polyimine compound(s) is kept to about half that of the carbanionic polymer, a second polymer can add at the carbon atom of another imine group which results in a macromolecule in which two chains are linked through the radical of a polyimine compound (such as, e.g., those defined by formulas (V) and (VI)). Similarly, where the equivalents of a polyimine compound such as that defined by formula (IV) is kept to about one-third that of the carbanionic polymer, a polymer chain can add at the carbon atom of each imine group, resulting in a macromolecule with three chains linked through the radical of the polyimine compound (e.g., formula (VII)). (The ordinarily skilled artisan can extend the foregoing description to the use of polyimine compounds that contain more than three imine groups.)

Reaction of polyimine compound(s) with living polymers can be performed relatively quickly (a few minutes to a few hours) at moderate temperatures (e.g., 0° to 75° C.).

Quenching, if desired, can be conducted by stirring the polymer and an active hydrogen-containing compound, such as an alcohol, water or an acid, for up to about 120 minutes at temperatures of from about 25° to about 150° C.

Solvent can be removed from the (quenched) polymer cement by conventional techniques such as drum drying, extruder drying, vacuum drying or the like, which may be combined with coagulation with water, alcohol or steam, thermal desolventization. If coagulation is performed, oven drying may be desirable.

Polymers and macromolecules such as those described above can display particularly advantageous properties when compounded with, inter alia, reinforcing fillers such as carbon black and silica. They can be utilized in a tread stock compound or can be blended with any conventionally employed tread stock rubber including natural rubber and/or non-functionalized synthetic rubbers such as, e.g., one or more of homo- and interpolymers that include just polyene-derived mer units (e.g., poly(butadiene), poly(isoprene), and copolymers incorporating butadiene, isoprene, and the like), SBR, butyl rubber, neoprene, ethylene/propylene rubber, ethylene/propylene/diene rubber, acrylonitrile/butadiene rubber, silicone rubber, fluoroelastomers, ethylene/acrylic rubber, ethylene/vinyl acetate interpolymer, epichlorohydrin rubbers, chlorinated polyethylene rubbers, chlorosulfonated polyethylene rubbers, hydrogenated nitrile rubber, tetrafluoroethylene/propylene rubber and the like. When a functionalized polymer(s) is blended with conventional rubber(s), the amounts can vary from about 5 to about 99% of the total rubber, with the conventional rubber(s) making up the balance of the total rubber. The minimum amount depends to a significant extent on the degree of hysteresis reduction desired.

Elastomeric compounds typically are filled to a volume fraction, which is the total volume of filler(s) added divided by the total volume of the elastomeric stock, often ~25%; typical (combined) amounts of reinforcing fillers range from about 30 to about 100 phr, with the upper end of the range being defined largely by how effectively processing equipment can handle the increased viscosities imparted when such fillers are employed.

Useful fillers include various forms of carbon black including, but not limited to, furnace black, channel blacks and lamp blacks. More specifically, examples of the carbon blacks include super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks, conducting channel blacks, and acetylene blacks; mixtures of two or more of these can be used. Carbon blacks having a surface area (EMSA) of at least 20 $m^2/g$, preferably at least about 35 $m^2/g$, are preferred; surface area values can be determined by ASTM D-1765 using the CTAB technique. The carbon blacks may be in pelletized form or an unpelletized flocculent mass, although unpelletized carbon black can be preferred for use in certain mixers.

The amount of carbon black can be up to about 50 phr, with about 5 to about 40 phr being typical.

Amorphous silica ($SiO_2$) also can be utilized as a filler. Silicas are generally classified as wet-process, hydrated silicas because they are produced by a chemical reaction in water, from which they are precipitated as ultrafine, spherical particles. These primary particles strongly associate into aggregates, which in turn combine less strongly into agglomerates. "Highly dispersible silica" is any silica having a very substantial ability to de-agglomerate and to disperse in an elastomeric matrix, which can be observed by thin section microscopy.

Surface area gives a reliable measure of the reinforcing character of different silicas; the Brunauer, Emmet and Teller ("BET") method (described in *J. Am. Chem. Soc.*, vol. 60, p. 309 et seq.) is a recognized method for determining surface area. BET surface areas of silicas generally are less than 450 $m^2/g$, commonly from ~32 to ~400 $m^2/g$ or from ~100 to ~250 $m^2/g$ or from ~150 to ~220 $m^2/g$.

The pH of the silica filler (when used) is generally from about 5 to about 7 or slightly over, preferably from about 5.5 to about 6.8.

Commercially available silicas include various grades of Hi-Sil™ powdered and granular silicas (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

Silica can be employed in the amount of about 1 to about 100 parts by weight (pbw) per 100 parts of polymer (phr), preferably in an amount from about 5 to about 80 phr. When used with carbon black, the amount of silica can be decreased to as low as about 1 phr; as the amount of silica decreases, lesser amounts of the processing aids, plus silane if any, can be employed.

When silica is employed, a coupling agent such as a silane often is added so as to ensure good mixing in, and interaction with, the elastomer(s). Generally, the amount of silane that is added ranges between about 4 and 20%, based on the weight of silica filler present in the elastomeric compound.

Coupling agents can have a general formula of A-T-X, in which A represents a functional group capable of bonding physically and/or chemically with a group on the surface of the silica filler (e.g., surface silanol groups); T represents a hydrocarbon group linkage; and X represents a functional group capable of bonding with the elastomer (e.g., via a sulfur-containing linkage). Such coupling agents include organosilanes, in particular polysulfurized alkoxysilanes (see, e.g., U.S. Pat. Nos. 3,873,489, 3,978,103, 3,997,581, 4,002,594, 5,580,919, 5,583,245, 5,663,396, 5,684,171, 5,684,172, 5,696,197, etc.) or polyorganosiloxanes bearing the X and A functionalities mentioned above. An exemplary coupling agent is bis[3-(triethoxysilyl)propyl]tetrasulfide.

Addition of a processing aid can be used to reduce the amount of silane employed. See, e.g., U.S. Pat. No. 6,525,118 for a description of fatty acid esters of sugars used as processing aids. Additional fillers useful as processing aids include, but are not limited to, mineral fillers, such as clay (hydrous aluminum silicate), talc (hydrous magnesium silicate), and mica as well as non-mineral fillers such as urea and sodium sulfate. Exemplary micas contain principally alumina, silica and potash, although other variants can be used. Additional fillers can be utilized in an amount of up to about 40 phr, typically up to about 20 phr.

Other conventional rubber additives also can be added. These include, for example, process oils, plasticizers, anti-degradants such as antioxidants and antiozonants, curing agents and the like.

All ingredients can be mixed with standard equipment such as, e.g., Banbury or Brabender mixers. Typically, mixing occurs in two or more stages. During the first stage (often referred to as the masterbatch stage), mixing typically is begun at temperatures of ~120° to ~130° C. and increases until a so-called drop temperature, typically ~165° C., is reached.

Where a formulation includes silica, a separate re-mill stage often is employed for separate addition of the silane component(s). This stage often is performed at temperatures similar to, although often slightly lower than, those employed in the masterbatch stage, i.e., ramping from ~90° C. to a drop temperature of ~150° C.

Reinforced rubber compounds conventionally are cured with about 0.2 to about 5 phr of one or more known vulcanizing agents such as, for example, sulfur or peroxide-based curing systems. For a general disclosure of suitable vulcanizing agents, the interested reader is directed to an overview such as that provided in Kirk-Othmer, *Encyclopedia of Chem. Tech.*, 3d ed., (Wiley Interscience, New York, 1982), vol. 20, pp. 365-468. Vulcanizing agents, accelerators, etc., are added at a final mixing stage. To reduce the chances of undesirable scorching and/or premature onset of vulcanization, this mixing step often is done at lower temperatures, e.g., starting at ~60° to ~65° C. and not going higher than ~105° to ~110° C.

Subsequently, the compounded mixture is processed (e.g., milled) into sheets prior to being formed into any of a variety of components and then vulcanized, which typically occurs at ~5° to ~15° C. higher than the highest temperatures employed during the mixing stages, most commonly about 170° C.

The following non-limiting, illustrative examples provide the reader with detailed conditions and materials that can be useful in the practice of the present invention.

EXAMPLES

In the examples, dried glass vessels previously sealed with extracted septum liners and perforated crown caps under a positive $N_2$ purge were used for all preparations. Butadiene (in hexane, 21.6% for Examples 1-4 and 22.6% for Examples 5-7), styrene (33% in hexane), hexane, n-butyllithium (1.60 M in hexane), 2,2-bis(2'-tetrahydrofuryl)propane solution (1.6 M solution in hexane, stored over $CaH_2$), and butylated hydroxytoluene (BHT) solution in hexane were used.

Commercially available reagents and starting materials included the following (with as-purchased purities given in parentheses), all of which were acquired from Sigma-Aldrich Co. (St. Louis, Mo.) and used without further purification unless otherwise noted in a specific example: 2-pyridinecarboxaldehyde (99%), triethylamine (99%), 1,2-diaminoethane (99.5%), (±)-trans-1,2-diamino-cyclohexane (99%), hydrobenzamide (98%, hereinafter referred to as "HBA"), N-benzylidenebenzylamine (99%, hereinafter referred to as "N-BBA"), and N-benzylidenemethylamine (97%, hereinafter referred to as "BMA").

Additional bis-imine compounds were synthesized. For example, 7.2 mL (60 mmol) (±)-trans-1,2-diamino-cyclohexane and 12 mL (126 mmol) 2-pyridinecarboxaldehyde in 60 mL $CH_2Cl_2$ and 10 mL triethylamine were stirred for ~24 hours at room temperature. Solvent was removed by rotary evaporation, and the residue purified by silica gel chromatography (200~425 mesh silica gel sorbent from Fisher Scientific Co. L.L.C., Pittsburgh, Pa.) using a 50:50:1 blend of ethyl acetate, hexane, and triethylamine as eluent. Approximately 8.0 g (~46% yield) of (±)-trans-N,N'-bis(2-pyridylene)cyclohexanediamine (hereinafter referred to as "BPCDA") was recovered, with structure confirmed through $^1H$ and $^{13}C$ NMR (in $CDCl_3$) conducted on a Varian™ 300 MHz spectrometer. (Similarly, N,N'-bis(2-pyridylene)ethylenediamine, hereinafter referred to as "BPEDA", was prepared using 1,2-diaminoethane in place of (±)-trans-1,2-diaminocyclohexane as a starting material.)

Data in the Examples was acquired from tests on filled compositions made according to the formulation shown in Table 1 (carbon black only) where N-phenyl-N'-(1,3-dimethylbutyl)-p-phenylenediamine acts as an antioxidant and benzothiazyl-2-cyclohexylsulfenamide and N,N'-diphenylguanidine act as accelerators.

TABLE 1

| Compound formulation, carbon black only | |
|---|---|
| | Amount (phr) |
| Masterbatch | |
| polymer | 100 |
| carbon black (N343 type) | 55 |
| wax | 1 |
| N-phenyl-N'-(1,3-dimethylbutyl)-p-phenylenediamine | 0.95 |
| ZnO | 2.5 |
| stearic acid | 2 |
| aromatic processing oil | 10 |
| Final | |
| sulfur | 1.3 |
| N-cyclohexylbenzothiazole-2-sulfenamide | 1.7 |
| N,N'-diphenylguanidine | 0.2 |
| TOTAL | 174.65 |

Data corresponding to "50° C. Dynastat tan δ" were acquired from tests conducted on a Dynastat™ mechanical spectrometer (Dynastatics Instruments Corp.; Albany, N.Y.) using the following conditions: 1 Hz, 2 kg static mass and 1.25 kg dynamic load, a cylindrical (9.5 mm diameter×16 mm height) vulcanized rubber sample, and 50° C.

Data corresponding to "Dispersion index" were calculated using the equation $$DI=100-\exp[A\times\log_{10}(F^2H)+B]$$

where F is the number of roughness peaks/cm, H is the average roughness peak height, and A and B are constants from Method B in ASTM-D 2663-89. The F and H contour data were acquired by analyzing cut samples (~3.5×2×0.2 cm) with a Surfanalyzer™ profilometer (Mahr Federal Inc.; Providence, R.I.), using the procedure described in Method C (from ASTM-D 2663-89).

Data corresponding to "Bound rubber" were determined using the procedure described by J. J. Brennan et al., *Rubber Chem. and Tech.*, 40, 817 (1967).

Examples 1-4

To a $N_2$-purged reactor equipped with a stirrer were added 1.55 kg hexane, 0.41 kg styrene solution, and 2.52 kg butadiene solution. The reactor was charged with 3.60 mL n-butyllithium, followed by 1.10 mL of 2,2-bis(2'-tetrahydrofuryl)propane solution. The reactor jacket was heated to 50° C. and, after ~24 minutes, the batch temperature peaked at ~64° C.

After an additional ~30 minutes, portions of the polymer cement were transferred from the reactor to four dried glass vessels.

Three of these samples were terminated (50° C. bath for ~30 minutes) with, respectively, 2×0.46 mL 1.0 M BMA (sample 2), 2×0.46 mL 1.0 M N-BBA (sample 3), and 2×0.23 mL 1.0 M HBA (sample 4). These and a non-functionalized control (sample 1) were coagulated in isopropanol containing BHT and drum dried.

Examples 5-6

To a N$_2$-purged reactor equipped with a stirrer were added 1.67 kg hexane, 0.41 kg styrene solution, and 2.41 kg butadiene solution. The reactor was charged with 4.08 mL n-butyllithium, followed by 1.10 mL of 2,2-bis(2'-tetrahydrofuryl)propane solution. The reactor jacket was heated to 50° C. and, after ~31 minutes, the batch temperature peaked at ~58° C.

After an additional ~30 minutes, portions of the polymer cement were transferred from the reactor to three dried glass vessels.

Two of these samples were terminated (50° C. bath for ~30 minutes) with, respectively, 2×0.23 mL 1.0 M BPCDA (sample 5) and 2×0.23 mL 1.0 M BPEDA (sample 6). Each was coagulated in isopropanol containing BHT and drum dried.

Using the formulation from Table 1 above, vulcanizable elastomeric compounds containing reinforcing fillers were prepared from samples 1-6. Results of physical testing on these compounds are shown below in Table 2.

TABLE 2

Testing data from Examples 1-6

|  | 1 | 2 | 3 | 4 | 5 | 6 |
|---|---|---|---|---|---|---|
| $M_n$ (kg/mol) | 97 | 109 | 121 | 142 | 137 | 180 |
| $M_w/M_n$ | 1.05 | 1.03 | 1.04 | 1.16 | 1.29 | 1.20 |
| % coupling | 0.0 | 0.0 | 0.0 | 39.0 | 54.8 | 52.6 |
| $T_g$ (° C.) | −37.0 | −34.1 | −37.6 | −34.8 | −36.9 | −34.6 |
| Dispersion index | 96.0 | 97.4 | 99.0 | 95.1 | 95.5 | 95.6 |
| Bound rubber (%) | 10.2 | 16.2 | 26.8 | 29.6 | 22.0 | 26.1 |
| 171° C. MDR $t_{50}$ (min) | 3.05 | 2.75 | 3.18 | 3.11 | 2.12 | 2.28 |
| 171° C. MH-ML (kg-cm) | 17.0 | 19.8 | 18.5 | 17.2 | 17.4 | 18.0 |
| $ML_{1+4}$ @ 130° C. | 18.6 | 27.6 | 29.2 | 49.3 | 42.3 | 52.8 |
| 300% modulus @ 23° C. (MPa) | 9.4 | 12.6 | 10.8 | 11.7 | 12.8 | 13.6 |
| Tensile strength @ 23° C. (MPa) | 16.0 | 16.2 | 16.2 | 18.9 | 19.8 | 17.9 |
| Temp. sweep 0° C. tan δ | 0.205 | 0.222 | 0.189 | 0.295 | 0.232 | 0.252 |
| Temp. sweep 50° C. tan δ | 0.272 | 0.254 | 0.240 | 0.216 | 0.177 | 0.200 |
| RDA 0.25-14% ΔG' (MPa) | 5.060 | 3.590 | 3.956 | 1.150 | 0.716 | 1.448 |
| 50° C. RDA strain sweep (5% strain) tan δ | 0.2935 | 0.2337 | 0.2404 | 0.1498 | 0.1213 | 0.1472 |
| 50° C. Dynastat tan δ | 0.2743 | 0.2094 | 0.2197 | 0.1466 | 0.1186 | 0.1380 |

From the data of Table 2, one can see that styrene/butadiene interpolymers having terminal —NH—R$^5$—NH—CR$^3$R$^4$R' functionalization can provide excellent combinations of physical properties such as 50° C. strain sweep tan δ (an indicator of reduced hysteresis), bound rubber, modulus, tensile strength, ΔG', etc., in vulcanizates where carbon black is the only type of particulate filler. Compared to a control interpolymer, such functionalized interpolymers can exhibit significant reductions in tan δ, e.g., ~50-60% for Examples 4-6, reduced Payne effect (lower ΔG' values), and better projected wet traction performance (higher tan δ at 0° C.).

That which is claimed is:

1. A method for providing a functionalized polymer comprising reacting a carbanionic polymer with one or more polyimine compounds, at least one of said one or more polyimine compounds being

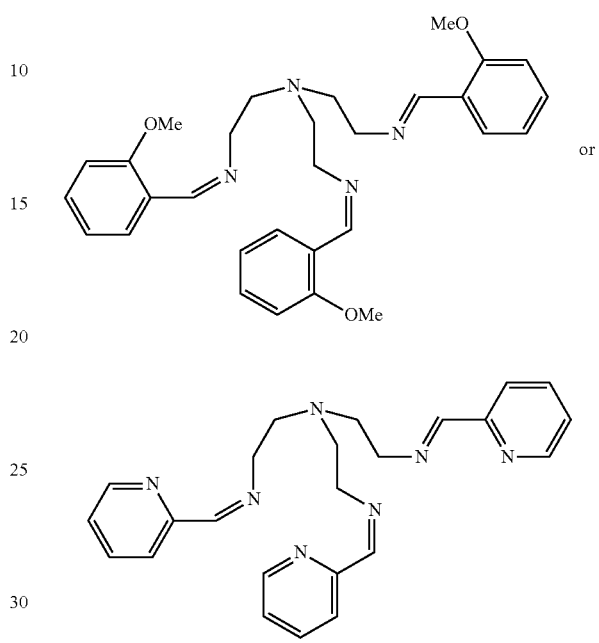

where Me represents a methyl group.

2. The method of claim 1 wherein one equivalent of said one or more polyimine compounds is reacted with two equivalents of carbanionic polymer.

3. The method of claim 1 wherein one equivalent of said one or more polyimine compounds is reacted with three equivalents of carbanionic polymer.

4. A method for providing a functionalized polymer comprising reacting a carbanionic polymer with one or more polyimine compounds, at least one of said one or more polyimine compounds having a structure defined by one of the following general formulae:

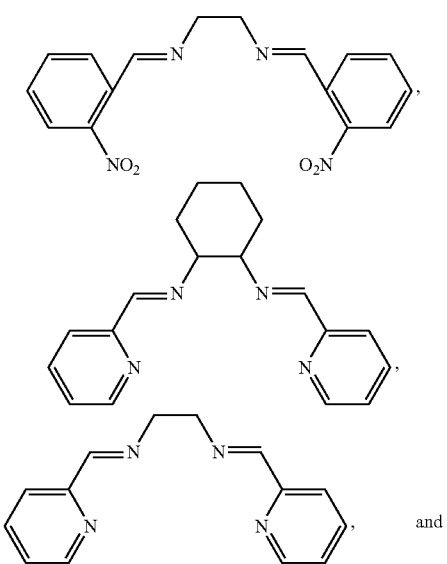, 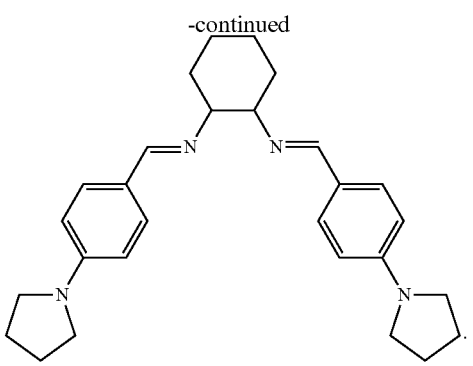 and
-continued
5. The method of claim 4 wherein one equivalent of said one or more polyimine compounds is reacted with two equivalents of carbanionic polymer.
* * * * *